(12) United States Patent
Gallagher

(10) Patent No.: US 6,891,977 B2
(45) Date of Patent: May 10, 2005

(54) METHOD FOR SHARPENING A DIGITAL IMAGE WITHOUT AMPLIFYING NOISE

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 464 days.

(21) Appl. No.: 10/084,006

(22) Filed: Feb. 27, 2002

(65) Prior Publication Data
US 2003/0161544 A1 Aug. 28, 2003

(51) Int. Cl.[7] .................................................. G06K 9/40
(52) U.S. Cl. ........................ 382/263; 382/264; 382/254
(58) Field of Search ................................ 382/162, 165, 382/173, 254, 263, 264, 266, 274, 275, 300; 358/1.2; 345/660

(56) References Cited

U.S. PATENT DOCUMENTS

| 4,571,635 A | 2/1986 | Mahmoodi et al. ......... 358/510 |
| 4,761,819 A | 8/1988 | Denison et al. ............. 382/261 |
| 5,081,692 A | 1/1992 | Kwon et al. ................ 382/263 |
| 5,325,217 A | 6/1994 | Nagler et al. |
| 5,682,443 A | 10/1997 | Gouch et al. ............... 382/254 |
| 6,118,906 A * | 9/2000 | Keyes et al. ................ 382/266 |
| 6,229,625 B1 | 5/2001 | Nakatsuka |
| 6,330,372 B1 | 12/2001 | Goldstein et al. |
| 6,738,494 B1 * | 5/2004 | Savakis et al. ............. 382/100 |

FOREIGN PATENT DOCUMENTS

| EP | 1 063 611 A2 | 12/2000 |
| EP | 1 111 906 A2 | 6/2001 |
| EP | 1 174 824 A2 | 1/2002 |

OTHER PUBLICATIONS

Textbook: Jain, Fundamentals of Digital Image Processing, 1989, Prentice–Hall, pp. 249–251.
U.S. Appl. No. 10/016,601, filed Dec. 10, 2001 by Luo et al.

* cited by examiner

Primary Examiner—Kanjibhai Patel
Assistant Examiner—Sath Perungavoor
(74) Attorney, Agent, or Firm—Thomas H. Close

(57) ABSTRACT

A method of sharpening a digital image having image pixels according to its material content, includes the steps of: generating a subject matter belief map corresponding spatially to the image pixels, having belief values indicating the likelihood that respective image pixels are representative of a particular subject matter, generating a noisy pixel belief map corresponding spatially to the image pixels having belief values indicating the likelihood that the modulation about respective pixels are due to system noise; generating gain map from the subject matter belief map and the noisy pixel belief map having values that indicate the degree of sharpening to be applied to the image pixels; and using the gain map to sharpen the image.

6 Claims, 4 Drawing Sheets

METHOD FOR SHARPENING A DIGITAL IMAGE WITHOUT AMPLIFYING NOISE

FIELD OF THE INVENTION

The invention relates generally to the field of digital image processing and, more particularly, to a method of image sharpening.

BACKGROUND OF THE INVENTION

In processing a digital image, it is common to sharpen the image and enhance fine detail with sharpening algorithms. Typically, sharpening is performed by a convolution process (for example, see A. K. Jain, *Fundamentals of Digital Image Processing*, Prentice-Hall: 1989, pp. 249–251). The process of unsharp masking is an example of a convolution-based sharpening process. For example, sharpening an image with unsharp masking can be described by the equation:

$$s(x,y)=i(x,y)b(x,y)+\beta f(i(x,y)-i(x,y)b(x,y)) \quad (0)$$

where:

$s(x,y)$=output image with enhanced sharpness
$i(x,y)$=original input image
$b(x,y)$ lowpass filter
$\beta$=unsharp mask scale factor
$f(\ )$=fringe function
$**$ denotes two dimensional convolution
$(x,y)$ denotes the $x^{th}$ row and the $y^{th}$ column of an image Typically, an unsharp image is generated by convolution of the image with a lowpass filter (i.e., the unsharp image is given by $i(x,y)b(x,y)$). Next, the highpass, or fringe data is generated by subtracting the unsharp image from the original image (i.e., the highpass data is found with $i(x,y)-i(x,y)b(x,y)$). This highpass data is then modified by either a scale factor $\beta$ or a fringe function $f(\ )$ or both. Finally, the modified highpass data is summed with either the original image or the unsharp image to produce a sharpened image.

A similar sharpening effect can be achieved by modification of the image in the frequency domain (for example, the FFT domain) as is well known in the art of digital signal processing.

It is occasionally desirable to sharpen different regions or pixels of the image by different amounts. For example, is it has been suggested that it is desirable to sharpen the pixels representing human faces to a lesser degree than pixels representing a building. For example, in U.S. Pat. No. 5,682,443 issued Oct. 28, 1997, Gouch et al. describe the modification of the gain of the unsharp mask based on the color of a pixel (and the color of the surrounding neighborhood). A problem with this approach is the undesirable noise enhancement that accompanies the image sharpening.

Alternatively, in U.S. Pat. No. 4,571,635 issued Feb. 18, 1996, Mahmoodi et al. teach a method of deriving an emphasis coefficient $\beta$ that is used to scale the high frequency information of the digital image depending on the standard deviation of the image pixels within a neighborhood. In addition, in U.S. Pat. No. 5,081,692 issued Jan. 14, 1992, Kwon et al. teach that emphasis coefficient $\beta$ is based on a center weighted variance calculation. In U.S. Pat. No. 4,761,819 issued Aug. 2, 1988, Denison et al. describe a method where the gain of an unsharp mask is dependent on both a local variance calculation and a noise statistic.

While these methods do indeed sharpen the image while attempting to minimize noise enhancement, they do not vary the sharpening amount based on color, as Gouch describes. It is not apparent how one would go about modifying the gain parameter $\beta$ of a linear sharpening filter based on both the noise characteristics and the non-noise characteristics (for example color) of the image. Generally, adaptive sharpening methods utilizing noise information apply less sharpening to noisy image areas. However, these image areas may already be receiving a very low amount of sharpening due to other considerations.

In European Patent Application 1174824A2, published Jan. 23, 2002, Gindele and Gallagher describe a noise reduction filter that performs a variable amount of noise reduction based on the color of the pixel. In this filter, the coefficients in the convolution are dynamically derived for each pixel, and depend on the values of the pixel and the neighboring pixels (which are involved in the convolution operation). Because the coefficients of the convolution are dynamically derived for each pixel the filter coefficients are dependent on the pixel values in a local neighborhood. Such a filter is not typically used for image sharpening operations.

Therefore, there exists a need for an improved image sharpening method that adjusts the amount of sharpening based on both the material content of the image and the amount of noise in the image.

SUMMARY OF THE INVENTION

The need is met according to the present invention by providing a method of sharpening a digital image having image pixels according to its material content that includes the steps of: generating a subject matter belief map corresponding spatially to the image pixels, having belief values indicating the likelihood that respective image pixels are representative of a particular subject matter; generating a noisy pixel belief map corresponding spatially to the image pixels having belief values indicating the likelihood that the modulation about respective pixels are due to system noise; generating gain map from the subject matter belief map and the noisy pixel belief map having values that indicate the degree of sharpening to be applied to the image pixels; and using the gain map to sharpen the image.

ADVANTAGES

The present invention has the advantage of producing sharper images with fewer artifacts.

DETAILED DESCRIPTION OF THE INVENTION

In the following description, an embodiment of the present invention will be described as a method implemented as a software program. Those skilled in the art will readily recognize that the equivalent of such software may also be constructed in hardware. Because image enhancement algorithms and methods are well known, the present description will be directed in particular to elements forming part of, or cooperating more directly with, the method and system in accordance with the present invention. Other elements, and hardware and/or software for producing and otherwise processing the image signals, not specifically shown or described herein, may be selected from such materials, components and elements known in the art. Given the system and method as shown and described according to the invention in the following materials, software not specifically shown, described or suggested herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM), or any other physical device or medium employed to store a computer program.

A digital image typically includes one or more two-dimensional arrays of numbers. For example, a color digital image may include three arrays representing red, green, and blue pixel values respectively, or a monochrome image may include one array of pixel values corresponding to light intensities. With regard to matters of nomenclature, the value of a pixel of a digital image located at coordinates (x,y), referring to the $x^{th}$ row and the $y^{th}$ column of a digital image, shall herein comprise a triad of values [r(x,y), g(x,y), b(x,y)] respectively referring to the values of the red, green and blue digital image channels at location (x,y). In this regard, a digital image may be considered as comprising a certain number of digital image channels. In the case of a digital image comprising red, green and blue two-dimensional arrays, the image comprises three channels, namely, red, green and blue spectral channels.

In general, the present invention describes a method of sharpening an image where the sharpening amount (applied to any local region of the image) is dependent on both the amount of noise present at the local region and sharpening target levels related to semantic information in the local region. As used herein, the term semantic refers to the meaning that would be assigned to a region by an observer. For example, the semantic content of a region may be an object such as a human face, a building, a cloud, or the sky.

Figure 1:
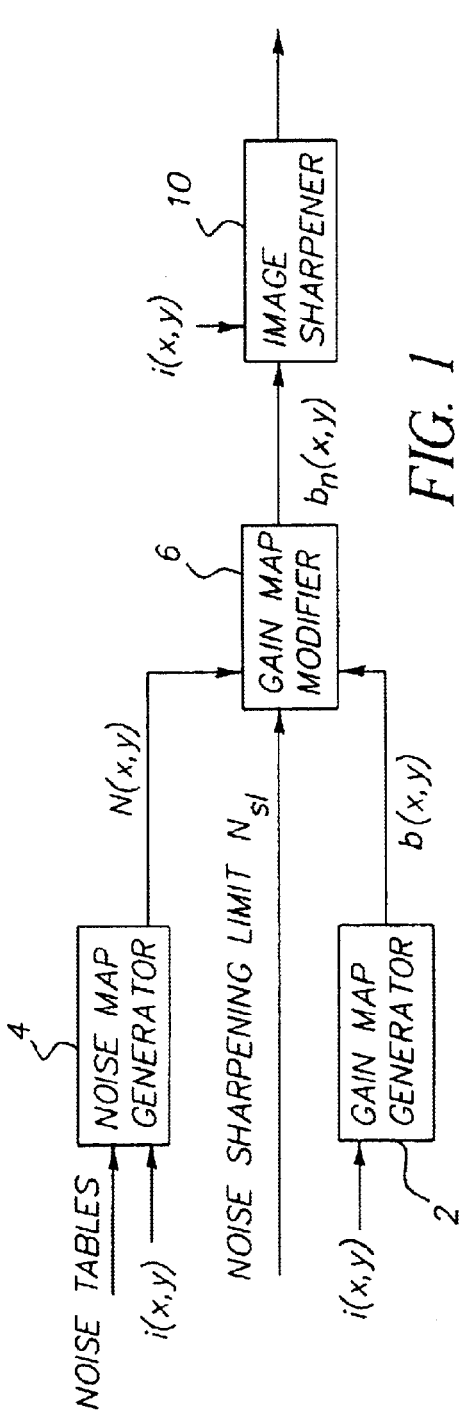
FIG. 1 is a block diagram illustrating a technique for sharpening an image according to a first embodiment of the invention.

Referring to FIG. 1, an image i(x,y) having $x_0$ rows and $y_0$ columns is input to a noise map generator 4 for producing a noisy pixel belief map N(x,y). Preferably, the image i(x,y) is of high resolution, for example, an illustrative high resolution image would have $x_0=1024$ rows of pixels by $y_0=1536$ columns of pixels. The noisy pixel belief map is a map that indicates a belief that the variations in intensity occurring about a given pixel are due to noise in the imaging system rather than image content.

Noise in an imaging system is intensity dependent. Therefore at any given intensity level, the expected modulation due to noise is known. If the observed modulation is greater than the expected noise modulation, there is a strong belief that the modulation is due to image content. If the observed modulation is less than or equal to the expected noise, there is a strong belief that the modulation is due to noise. Preferably, the belief is expressed as a probability ranging from 0 to 100% that a pixel is a noisy pixel. Uniform image areas (e.g. clear blue sky) will generally result in a high belief that the pixels are noisy, while pixels belonging to busy regions (e.g. hair, grass) will generally result in low or 0 belief that the pixels are noisy.

The noisy pixel belief map N(x,y) is preferably the same size as the image i(x,y). Also, the belief values of the noisy pixel belief map are preferably generated by considering both the local signal variance (measured over the image pixel values) and the expected amount of noise. For example, U.S. Pat. No. 4,761,819, referenced above, by Dennison et al. describes generating a signal G(i,j) which is dependent both on the local variance V(i,j) and the expected level of noise V(noise). In this way, the noisy pixel belief map indicates pixels or regions having high probability of having a low signal to noise ratio (high probability of being a noisy pixel). A signal such as G(i,j) could easily be converted to a noisy pixel belief map by using a look-up-table (LUT) or linear function as is well known in the art of image processing. For example, the value of the noisy pixel belief map could be 0 where $G(i,j)>t_1$, 100 where $G(i,j)<t_2$, and attain values intermediate of 0 and 100 when G(i,j) is between $t_1$ and $t_2$. For example, $t_1=5$ and $t_2=½$. Alternatively, European Patent Application No. 1111906A2, by Gallagher et al., published Jun. 27, 2001, describes a method for generating an expected value of noise is based on the intensity of the pixel that can be used with a look up table to generate the noisy pixel belief map.

Figure 2:
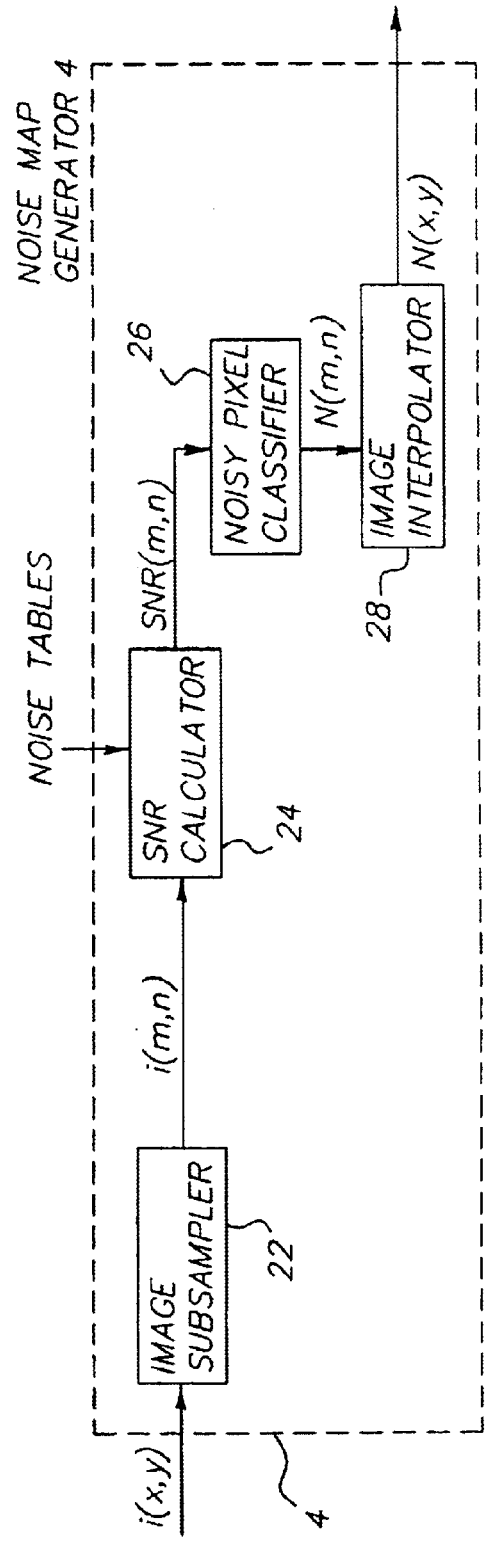
FIG. 2 is a block diagram of the noise map generator shown in FIG. 1.

The preferred method for generating the noisy pixel belief map by the noise map generator 4 is shown in FIG. 2. The image i(x,y) is passed to an image subsampler 22 which generates a low resolution version i(m,n) of the image. The low resolution image i(m,n) contains $m_0$ rows and $n_0$ columns of pixels, where $m_0=x_0/2^R$, $n_0=y_0/2^R$ and R is the factor of subsampling of the image indicating the number of subsamples by a factor of two that are required. Typically, the low resolution image i(m,n) is generated by a combination of filtering and subsampling by a factor of R as is well known in the art to reduce the effects of aliasing. Generating the noisy pixel belief map from a low resolution image saves substantial time (as compared with generating the noisy pixel belief map from the image i(x,y)) since there are fewer pixels upon which calculations are performed. Preferably, R=2, which saves approximately 94% of the processing time required to perform the same operations on the image i(x,y).

The low resolution image i(m,n) is input to the SNR calculator 24 for calculating the local signal to noise ratio, SNR(m,n) of the image channel to be sharpened at each location. The local signal to noise ratio is represented as a single value at each location (m,n), independent of the number of color channels of the image i(x,y). As will be described in more detail below, the preferred sharpening is applied to a single channel of the image, the luminance channel l(x,y). The luminance channel is created by linearly combining all the color channels of the image. For example:

$$l(x, y) = \sum_{n=0}^{n=C-1} a_n c_n(x, y) \quad (1)$$

where:

C is the number of image channels, $c_n$ is the $n^{th}$ color channel of the image i(x,y)

$a_n$ is the coefficient weighing factor for the $n^{th}$ color channel. The sum of all the coefficient weighting factors is preferably 1.0. In the case of an image i(x,y) having red, green, and blue channels, the preferred values for the red, green, and blue coefficient weighting factors are all equally ⅓.

In order to calculate the local signal to noise ratio at each pixel location, the SNR calculator 24 must determine the expected magnitude of noise at each pixel location. In the methods of the prior art, the expected magnitude of noise is calculated only from the channel to be sharpened, e.g. the luminance channel. However, it must be recognized that many different combinations of pixels values from the various channels can form identical luminance channel values through Eq. 1. Therefore, it is very possible that regions of an image may have identical mean luminance values, but quite different expected values of noise.

The SNR calculator 24 determines the local SNR of the luminance channel with the following equation:

$$SNR(m, n) = 1 + \mathrm{sign}[\sigma_n(m,n)^2 - \sigma_k(i(m,n))^2] \frac{\sqrt{|\sigma_n(m,n)^2 - \sigma_k(i(m,n))^2|}}{\sigma_k(i(m,n))} \quad (2)$$

where:
- $\sigma_n(m,n)$ is the local standard deviation of pixels in the luminance channel, preferably measured over a 5×5 window centered at location (m,n).
- $\sigma_k(i(m,n))$ is the expected standard deviation of noise of pixels on the image channel to be sharpened (preferably the luminance channel of i(m,n)), based on the expected levels of noise in each color channel of i(m,n).
- sign[q] is −1 if q<0, 1 otherwise.

The value of $\sigma_k(i(m,n))$ is a function of several items, including the coefficient weighting factors used to create the luminance channel, a noise table, the factor of subsampling R, and the pixel values of the subsampled image i(m,n).

The value of $\sigma_k(i(m,n))$ is given as:

$$\sigma_k(i(m,n)) = \frac{1}{R_f^R} \sqrt{\sum_{n=0}^{n=C-1} a_n^2 (\sigma_{c_n}[c_n(m,n)])^2} \quad (3)$$

Figure 3:
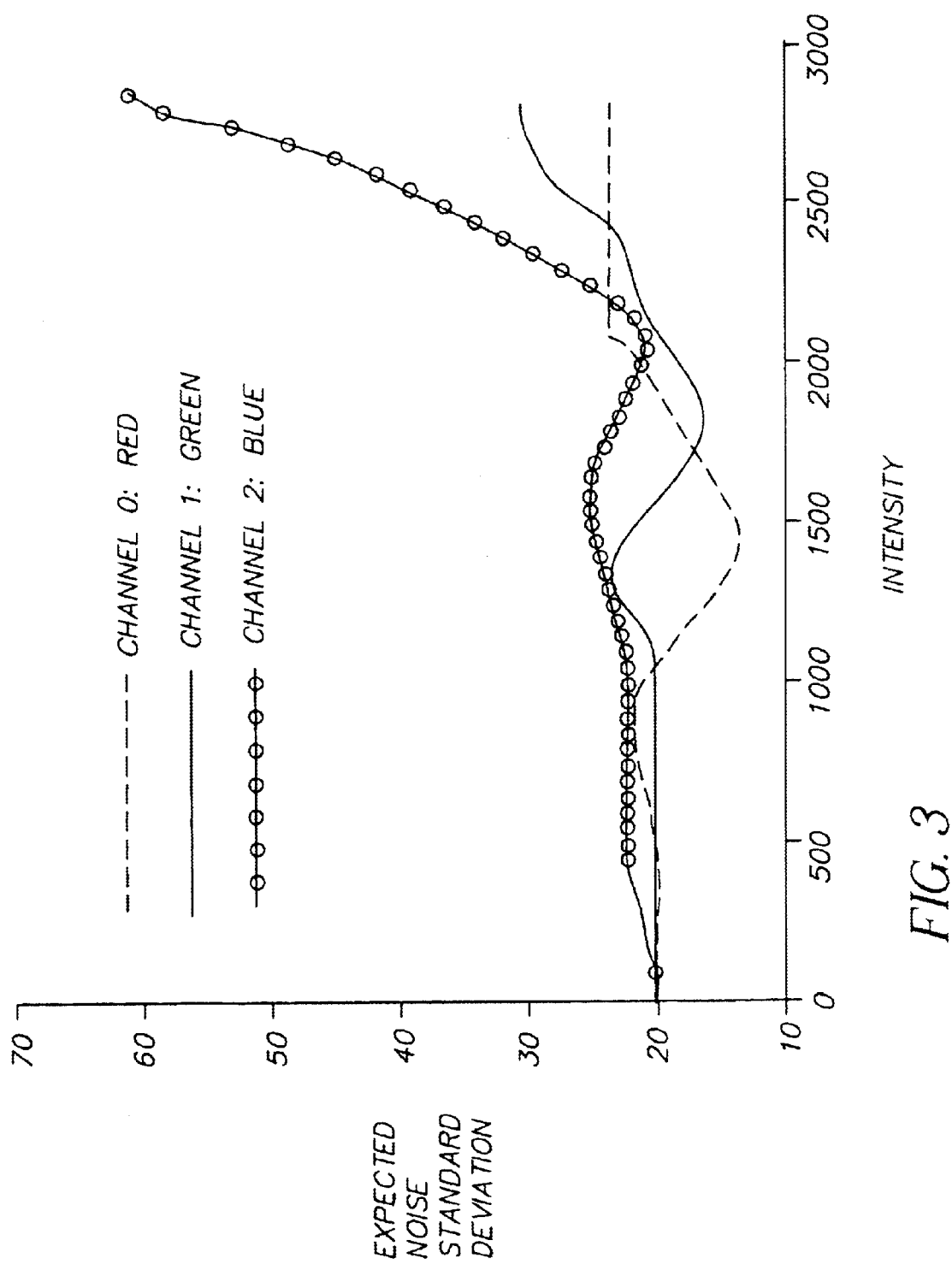
FIG. 3 is a graph showing an example noise table.

Where:
- R is the number of subsampling levels used by the image subsampler 22. Preferably R=2.
- $R_f$ is the ratio by which the standard deviation of noise is reduced at each resolution level. In the case of uncorrelated noise, $R_f$=2. For real film data, $R_f$=1.7 is roughly correct for small values of R (R<=3).
- $\sigma_{c_n}[q]$ is the standard deviation of noise at intensity q for the image color channel $c_n$. The noise table, for example as described in European Patent Application No. 1063611A2, by Gallagher et al., published Dec. 27, 2000, represents this relationship. FIG. 3 shows a plot of a noise table for images having red, green, and blue color channels for a digital image that was created by scanning a color photographic negative. Notice that the noise table represents the relationship between intensity and expected noise magnitude for each color channel at the resolution of the image i(x,y). The term $$\frac{1}{R_f^R}$$

in Eq. (3) is essentially a correction factor to adjust the full resolution noise tables to the resolution of the image i(m,n).

Figure 4:
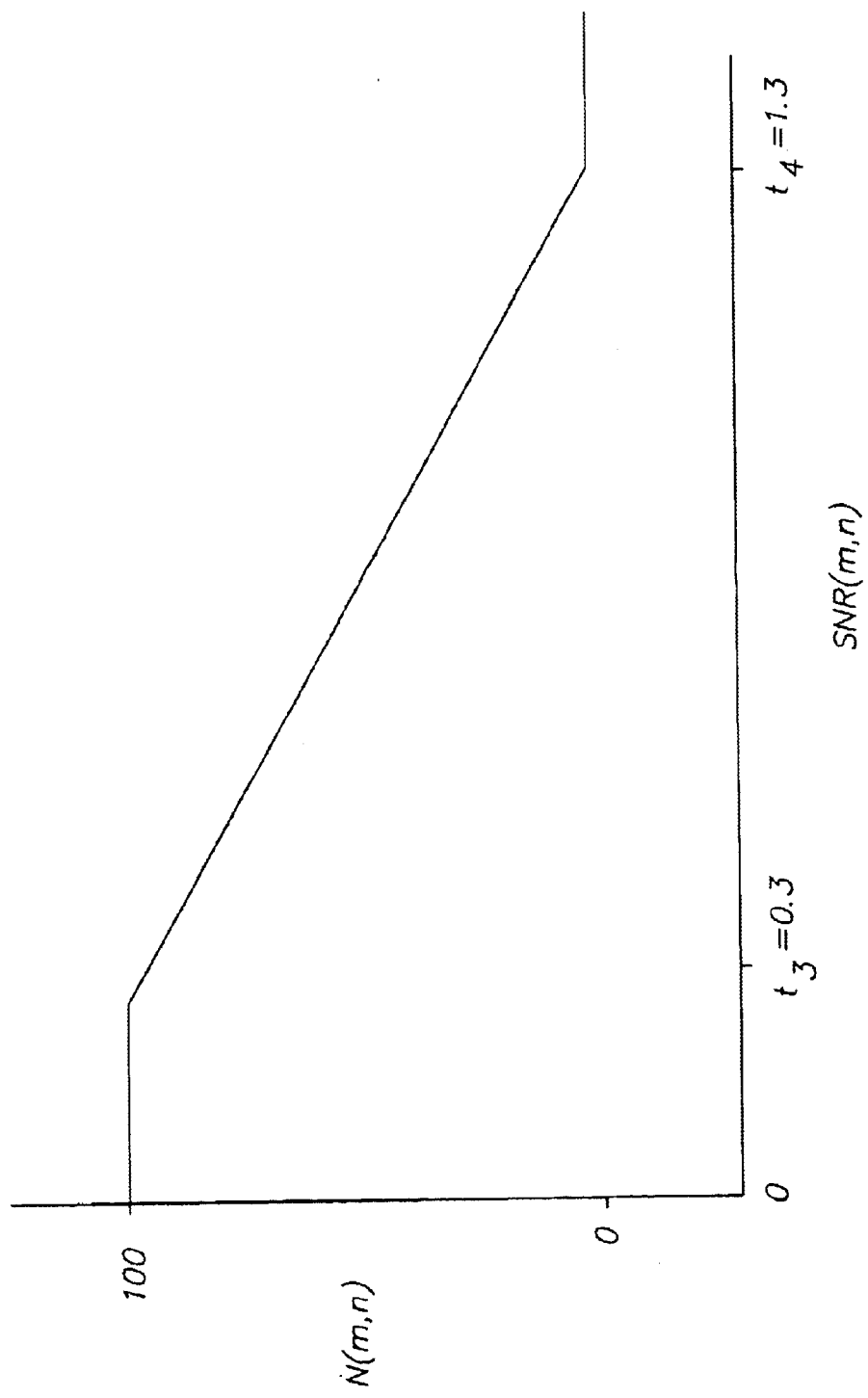
FIG. 4 shows a plot of a look up table used to convert from the SNR(m,n) image to the noisy pixel belief map N(m,n)

The SNR calculator 24 outputs a map SNR(m,n) indicating the signal to noise ratio at each pixel location of i(m,n). This map is input to the noisy pixel classifier 26 for converting the signal to a noise ratio map into a noisy pixel belief map. This is accomplished by using a look-up-table (LUT) or linear function as is well known in the art of image processing. For example, the value of the noisy pixel belief map could be 0 where SNR(m,n)>$t_3$, 100 where SNR(m,n)<$t_4$, and attain values intermediate of 0 and 100 when G(i,j) is between $t_3$ and $t_4$. For example, $t_3$=1.3 and $t_4$=0.3, as shown in FIG. 4. The noisy pixel belief map is then interpolated to the resolution of the image i(x,y) by an interpolator 28.

Those skilled in the art will recognize that certain variations to the noise map generator 24 may be made with relative ease which will have only a small effect on the appearance of the noisy pixel belief map. For example, rather than computing the local variance of the luminance channel in Eq. 2, the local variance of the highpass portion of the luminance channel may be computed. The expected level of noise in the highpass portion of the luminance channel will be linearly related to the quantity calculated in Eq. 3. The relationship can be derived from the filter used to generate the highpass portion of the luminance channel, using well-known principles of functions of random variables.

Returning to FIG. 1, the image i(x,y) is passed into the gain map generator 2. The purpose of the gain map generator 2 is to create a map indicating the gain of the sharpening operation on a pixel-by-pixel or region-by-region basis based on semantic labels derived from pattern recognition. The gain map is a control signal used to determine the level of sharpening to apply on a pixel-by-pixel basis. U.S. Ser. No. 10/016,601, filed Dec. 10, 2001 by Luo et al. describes a method by which the gain in an unsharp mask is varied based on the semantic content of a pixel region. Luo's belief map M(m,n) indicates the belief that particular pixels represent certain target subject matter, such as flesh or sky for which a desired level of sharpening has been determined.

The belief map is created by a subject matter detector that establishes the probability that a pixel or region in an image represents a given target material. The belief is preferably represented as a probability. For example, each pixel value M(m,n) is equal to 100 * P(pixel (m,n) of the low resolution image represents the target material), where P(A) represents the probability of event A. Alternatively, each pixel value M(m,n) may represent a binary classification indicating belief. For instance, a pixel value of 1 in the belief map may represent the belief that the pixel represents the target subject matter and a pixel value of 0 may represent the belief that the pixel does not represent the target subject matter. In the preferred embodiment, the target subject matter is human flesh. For example, it is advantageous in terms of image quality to sharpen human flesh less than other subject matters. The control signal β(x,y) indicates the gain of an unsharp mask for each pixel of an input image.

Figure 5:
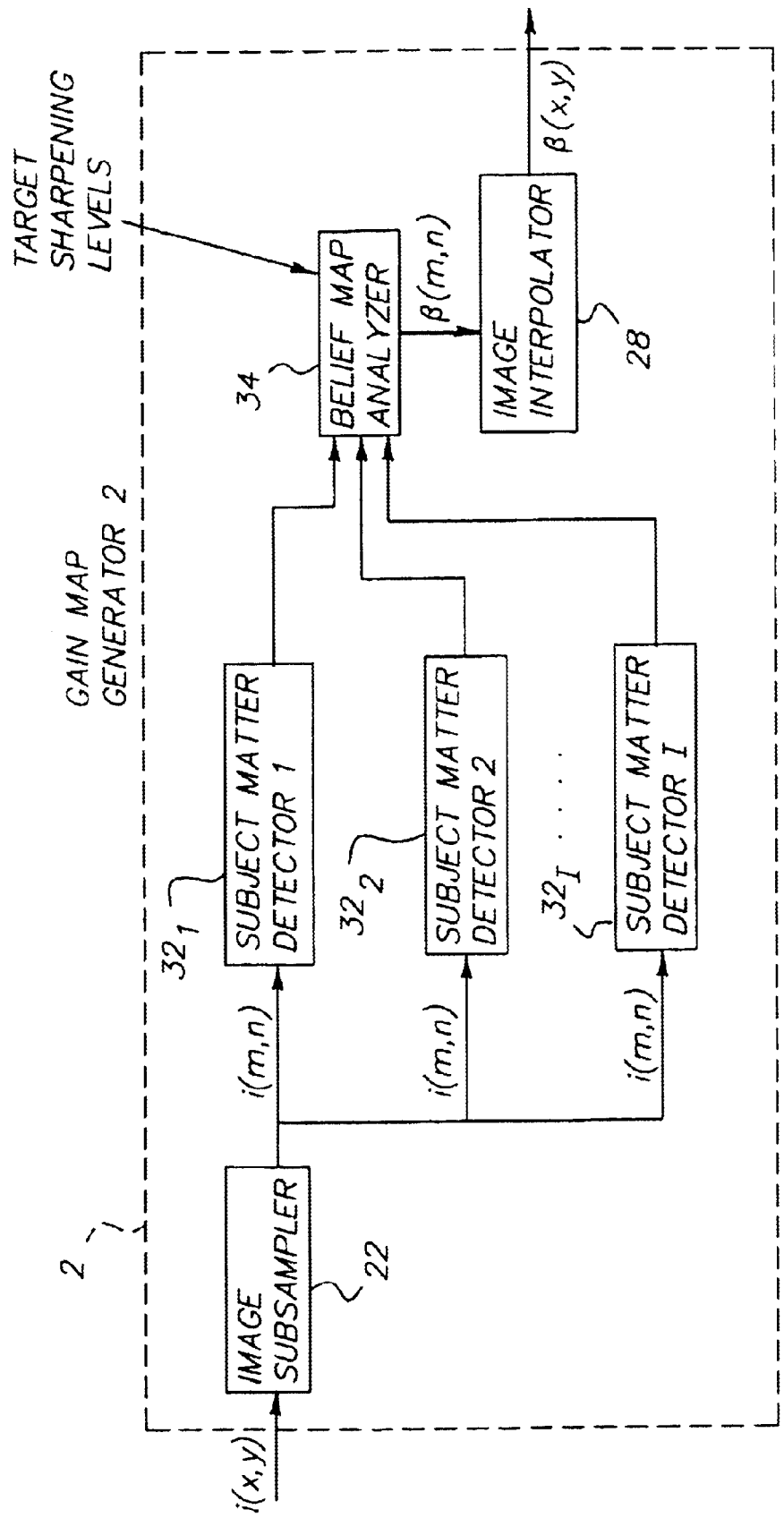
FIG. 5 is a block diagram of the gain map generator shown in FIG. 1.

As shown in FIG. 5, the control signal β(x,y) is created by first applying one or more subject matter detectors $32_1, \ldots, 32_I$ to the image (or a low resolution version of the image) to create subject matter belief maps, then the belief map analyzer 34 combines the belief maps with target sharpening levels for each subject matter to produce the gain map control signal β(x,y). The value of the control signal β(x,y) at any particular location (x,y) is related to the value of various belief maps M(x,y) at the corresponding image locations. Assuming that the size (in lines and columns) of the belief map is identical to the size of the image, the preferred relationship between the gain map control signal β(x,y) and the belief maps M(x,y) is given by the equation:

$$\beta(x, y) = \frac{\sum_i (M_i(x, y)(T_i - T_0))}{\max\left(\sum_i (M_i(x, y)), 1\right)} + T_0 \qquad (4)$$

where i represents the index of the subject matter detector. For example, $M_1(x,y)$ may be a belief map representing the belief of human flesh, $M_2(x,y)$ may be a belief map representing belief of blue sky, $M_3(x,y)$ may be a belief map representing the belief of grass, etc.

$T_i$ represents the control signal target for a pixel having high belief in the associated target subject matter. $T_i$ is referred to as the target sharpening levels. Continuing the above example, $T_1=0.5$ for human flesh, $T_2=1.0$ for blue sky, $T_3=3.0$ for green grass, etc.

$T_0$ represents the control signal target for a pixel that is generally considered to be background ("pure" background) by all the subject matter detectors. Preferably, $T_0=2.75$.

Referring back to FIG. 1, the gain map $\beta(x,y)$ generated by the gain map generator 2 is a control signal that indicates the amount of sharpening to apply to specific regions or pixels of the digital image $i(x,y)$. In the preferred embodiment, the gain map $\beta(x,y)$ is populated by values representing the gain parameter of an unsharp mask sharpening algorithm. The values of the gain map vary on a pixel-by-pixel or region-by-region basis depending on the criteria by which the gain map was created by the gain map generator 2. Typically, the values of the gain map $\beta(x,y)$ vary from 0.5 for pixels with high belief of representing flesh and 3.0 for pixels with high belief of representing sky and 2.75 for background pixels. The gain map generator 2 does not consider the noise content of the image when generating the gain map.

Both the noise map generator 4 and the gain map generator 2 can operate on a low resolution version of the image $i(x,y)$ in order to reduce the computational cost.

The noise map $N(x,y)$ from the noise map generator 4 and the gain map $\beta(x,y)$ from the gain map generator 2 are input to the gain map modifier 6. The purpose of the gain map modifier 6 is to modify the gain map so that the gain does not exceed a predetermined limit in areas where the noisy pixel belief map indicates high belief that the pixel or region is noisy. To this end, the gain map modifier also inputs a noise sharpening limit $N_{sl}$, which is a parameter indicating a maximum level of sharpening for noisy pixels. In the preferred embodiment, the noise sharpening limit $N_{sl}$ is the maximum gain of an unsharp mask for those pixels having high belief in the noisy pixel belief map $N(x,y)$. Preferably $N_{sl}=1.3$. The noise sharpening limit is not the desired sharpening level for all noisy pixels, because some pixels which are indicated as noisy pixels in the noisy pixel belief map may also already have sharpening levels in the gain map lower than the noise sharpening limit. The noise sharpening limit only affects the gain values of pixels when the following two conditions are met:

A. The gain value of the pixel in the gain map $\beta(x,y)$ is greater than the noise sharpening limit $N_{sl}$ B. The pixel has non-zero belief that the pixel is a noisy pixel. The final gain map $\beta_n(x,y)$ which considers the image noise is output from the gain map modifier 6. The final gain map is generated with the following equation, which meets the requirements set forth in A. and B. above:

$$\beta_n(x,y)=\min[\beta(x,y),N_{sl}]+N(x,y)\cdot(\max[\beta(x,y),N_{sl}]-N_{sl}) \qquad (5)$$

where $\min(\beta(x,y),N_{sl})$ is an image with the same number of rows and columns as $\beta(x,y)$. The image is identical to $\beta(x,y)$ for all pixels greater than $N_{sl}$ and is equal to $N_{sl}$ elsewhere.

$\max(\beta(x,y),N_{sl})$ is an image with the same number of rows and columns as $\beta(x,y)$. The image is identical to $\beta(x,y)$ for all pixels less than $N_{sl}$ and is equal to $N_{sl}$ elsewhere.

The final gain map $\beta_n(x,y)$ determined by the gain map modifier 6 is then input to the image sharpener 10. While in the present embodiment of the invention the final gain map $\beta_n(x,y)$ is the scale factor of an unsharp mask, the function of the gain map modifier 6 is not limited to the use of a scale factor and other sharpness related determinations could be used. For example, the filter used in the sharpening convolution performed by the image sharpener 10 could be determined by the gain map modifier 6 based on an analysis of the belief map.

The image $i(x,y)$ and the final gain map $\beta_n(x,y)$ are passed to the image sharpener for sharpening the image according the final gain map $\beta_n(x,y)$.

The image sharpener 10 inputs the sharpening parameter(s) and applies a sharpening algorithm to the image, utilizing the sharpening parameter(s) in order to produce an enhanced output image having improved sharpness without producing objectionable sharpness artifacts. In the preferred embodiment, the sharpener 10 applies an unsharp masking algorithm to the image using the final gain map $\beta_n(x,y)$ in order to produce the enhanced image, as is described in an equation below. For example, sharpening an image with an unsharp mask can be described with the following equation:

$$s(x,y)=i(x,y)b(m,n)+\beta_n(x,y)f(i(x,y)-i(x,y)b(m,n)) \qquad (6)$$

where $s(x,y)$=output image with enhanced sharpness $i(x,y)$=original input image $b(m,n)$=lowpass convolution filter (preferably a Gaussian lowpass filter with a size of 1 pixel per standard deviation. The filter coefficients of a 5×5 filter are as follows:

[0.003 0.0133 0.0219 0.0133 0.003 0.0133 0.0596 0.0983 0.0596 0.0133 0.0219 0.0983 0.162 0.0983 0.0219 0.0133 0.0596 0.0983 0.0596 0.0133 0.003 0.0133 0.0219 0.0133 0.003])

$\beta_n(x,y)$=final gain map $f(x,y)$=fringe function

** denotes two dimensional convolution $(x,y)$ denotes the $x^{th}$ row and the $y^{th}$ column of an image $(m,n)$ denotes the $m^{th}$ row and the $n^{th}$ column of the convolution filter Those skilled in the art will recognize that there are several methods by which unsharp masking (such as provided by Eq. (1)) can be applied to a color image having multiple channels. For example, the unsharp mask process can be applied to each channel of the color image. Preferably, the unsharp mask process is applied in the following manner.

Assuming the input image is a color image consisting of red, green, and blue color channels, a matrix is first applied to the image in order to produce a luminance channel and two or more color difference channels. Next the unsharp mask process is applied to the luminance channel. Finally, an inverse matrix is applied to the luminance and color difference channels to generate an enhanced color image having red green and blue channels.

Alternatively, the unsharp mask process may be applied to only a single image channel (e.g. the green channel), and the modified highpass data may be summed with each color channel in order to generate an enhanced color image. These and other similar modifications and enhancements to the unsharp mask process would be well understood by those of skill in this art. Since the particularities of their usage are not fundamentally related to the method of selecting sharpening parameters for the variable gain sharpening, their particular application does not act to in any way limit the scope of the invention.

Those skilled in the art will also recognize that although Eq. (6) and the present invention generally describe the sharpening applied to the image as being performed by an unsharp mask, that is not necessarily the case. Assuming the fringe function $f(\ )$ of Eq. (6) is identity, the unsharp mask process can be reconfigured as a single filter than can be applied with convolution to the image and produce results identical to the unsharp mask. For example, suppose the filter coefficients of b(x,y) are given as:

$$b(x, y) = \frac{\begin{bmatrix} 1 & 2 & 1 \\ 2 & 4 & 2 \\ 1 & 2 & 1 \end{bmatrix}}{16}.$$

Application of a filter c(x,y) with a convolution having coefficients given as $$c(x, y) = \frac{\begin{bmatrix} 1-\beta & 2(1-\beta) & 1-\beta \\ 2(1-\beta) & 4(1+3\beta) & 2(1-\beta) \\ 1-\beta & 2(1-\beta) & 1-\beta \end{bmatrix}}{16}$$

will produce identical results compared with using filter b(x,y) in the unsharp mask of Eq. (1). Such modifications to the preferred embodiment by the grouping of operations in the image sharpener 10 such as can be determined by methods well known in algebra and digital signal processing, will be evident to those of skill in this art and are within the scope of the present invention. Notice that in each case, the coefficients of the filter are independent of the pixel values surrounding location (x,y).

The present invention has been described with reference to a preferred embodiment. Changes may be made to the preferred embodiment without deviating from the scope of the present invention.

| PARTS LIST | |
|---|---|
| 2 | gain map generator |
| 4 | noise map generator |
| 6 | gain map modifier |
| 10 | image sharpener |
| 22 | image subsampler |
| 24 | SNR calculator |
| 26 | noisy pixel classifier |
| 28 | image interpolator |
| 32 | subject matter detector |
| 34 | belief map analyzer |

What is claimed is:

1. A method of sharpening a digital image having image pixels according to its material content, comprising the steps of:

a) generating a subject matter belief map corresponding spatially to the image pixels, having belief values indicating the likelihood that respective image pixels are representative of a particular subject matter;

b) generating a noisy pixel belief map corresponding spatially to the image pixels having belief values indicating the likelihood that the modulation about respective pixels are due to system noise;

c) generating gain map from the subject matter belief map and the noisy pixel belief map having gain values that indicate the degree of sharpening to be applied to the image pixels; and d) using the gain map to sharpen the image.

2. The method as claimed in claim 1, wherein the step of using the gain map to sharpen the image includes performing sharpening with an unsharp mask operation.

3. The method as claimed in claim 2, wherein the gain map comprises scale factors used in the unsharp mask operation.

4. The method claimed in claim 1, wherein the gain map is modified so that the gain values do not exceed a predetermined limit in areas where the noisy pixel belief map indicates belief that the pixel is noisy.

5. The method claimed in claim 4, wherein the predetermined limit is 1.3.

6. The method claimed in claim 4, wherein the predetermined limit is applied only to the gain values of pixels when the following two conditions are met: 1) the gain value of the pixel in the gain map $\beta(x,y)$ is greater than the noise sharpening limit $N_{sl}$; and 2) the pixel has non-zero belief that the pixel is a noisy pixel.

* * * * *